Aug. 26, 1930.                J. REINI                1,773,859
                       SIGNALING DEVICE FOR AUTOS
                    Filed March 14, 1928      3 Sheets-Sheet 1
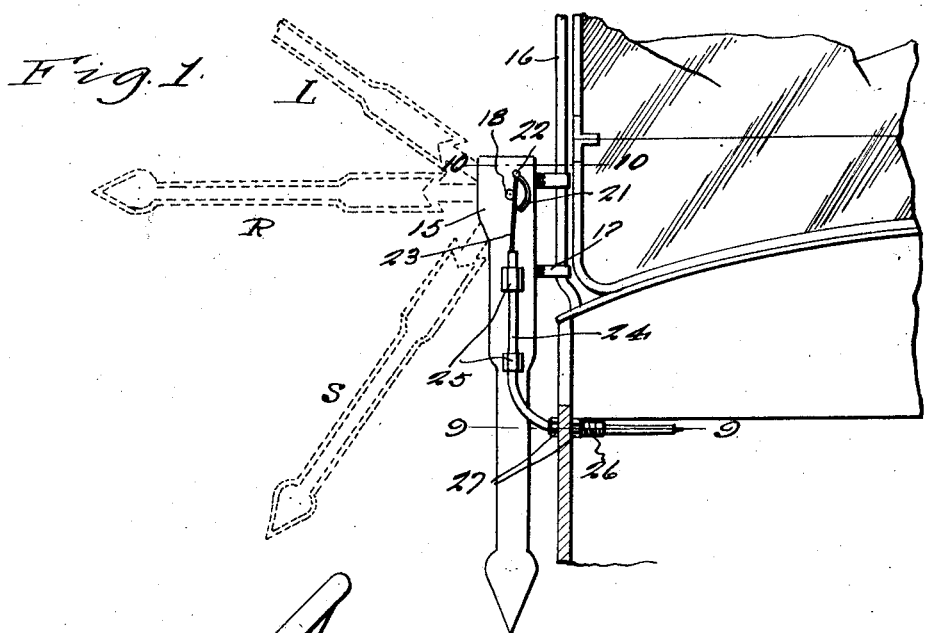
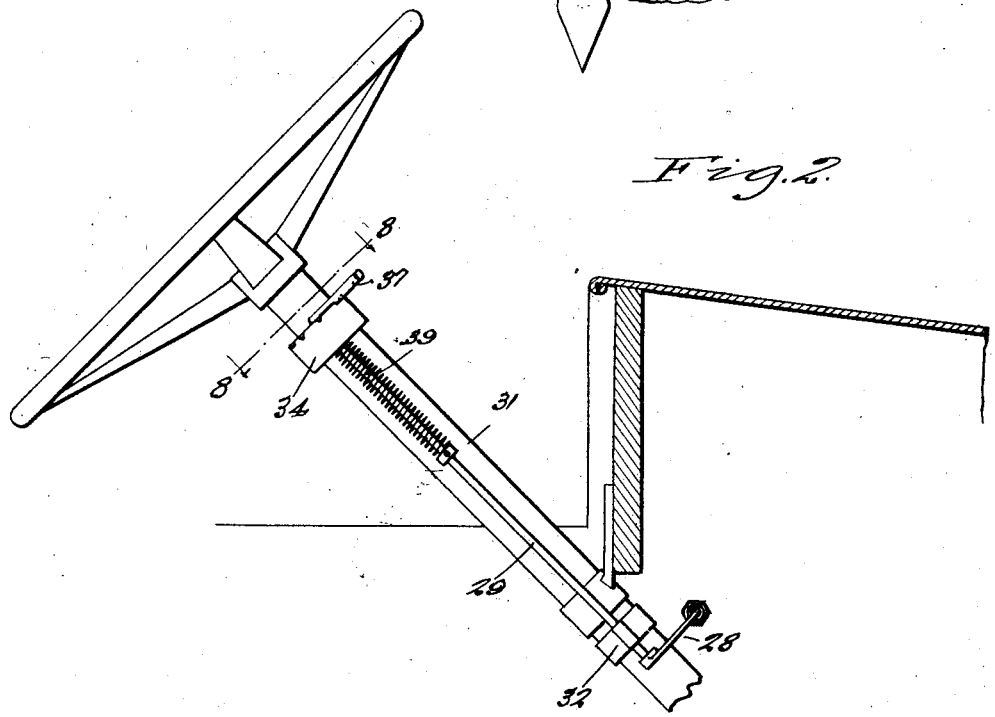
Jack Reini, INVENTOR
BY *Victor J. Evans*
ATTORNEY
WITNESS:

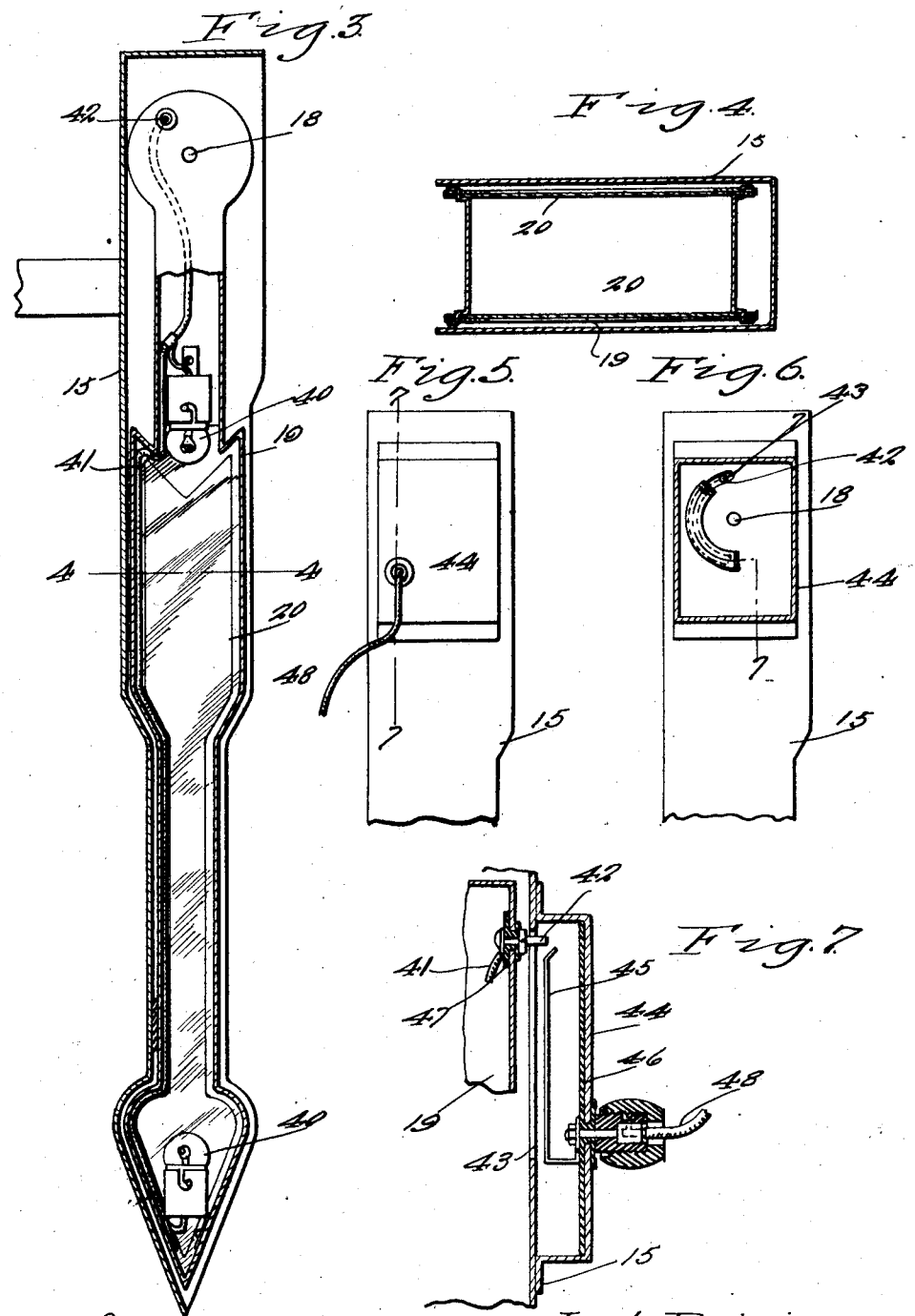

Aug. 26, 1930.   J. REINI   1,773,859
SIGNALING DEVICE FOR AUTOS
Filed March 14, 1928   3 Sheets-Sheet 3
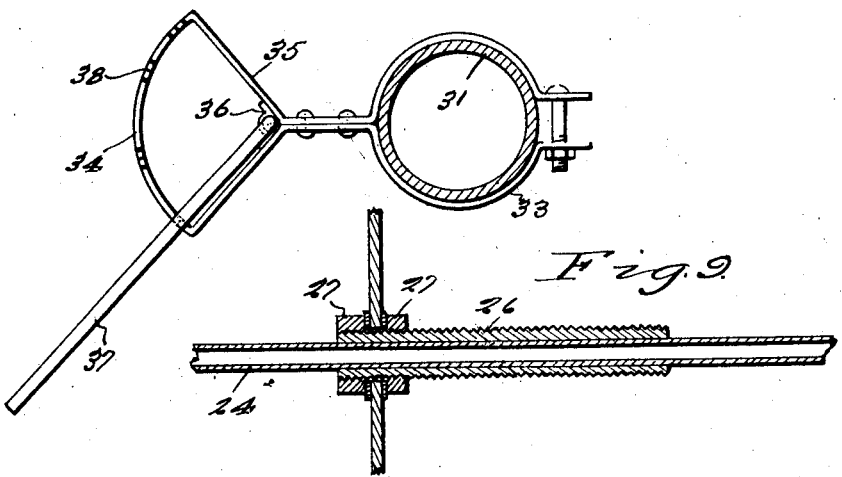
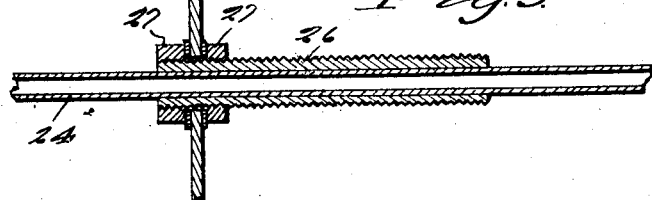
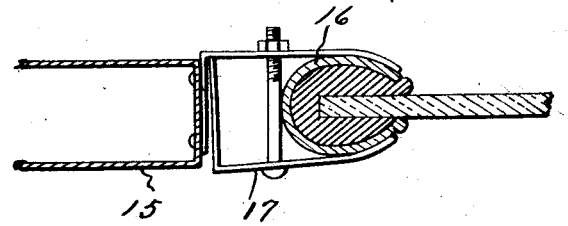
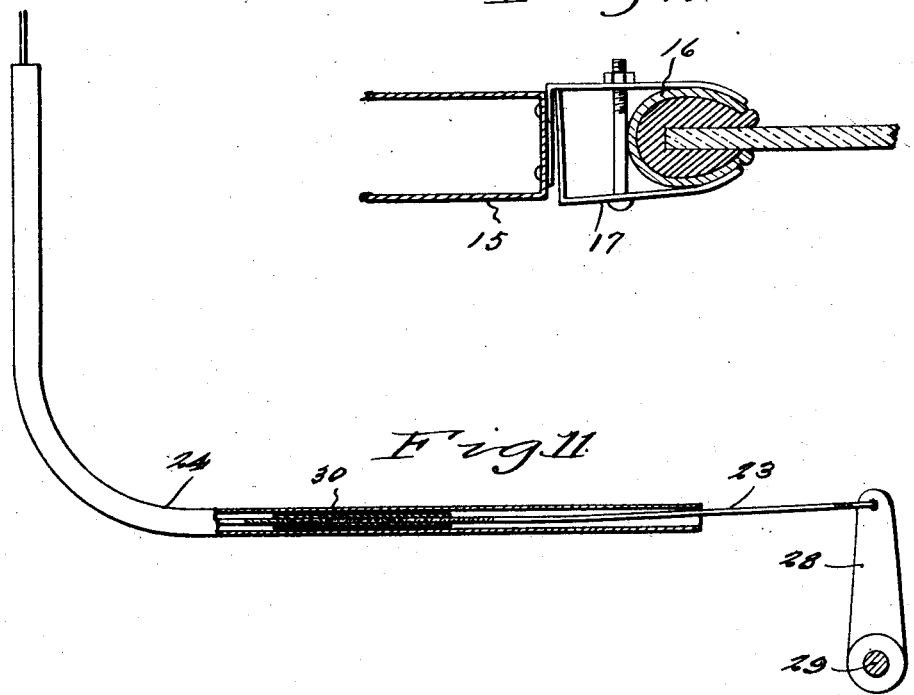
Jack Reini
INVENTOR Patented Aug. 26, 1930

1,773,859

UNITED STATES PATENT OFFICE

JACK REINI, OF VANCOUVER, WASHINGTON, ASSIGNOR OF FIFTY-EIGHT PER CENT TO ANTTI SIMILA, TEN PER CENT TO JOHN SKINNER, NINE PER CENT TO PETE MAKI, FIVE PER CENT TO P. M. KANE, FIVE PER CENT TO JONAS PARVI, AND FIVE PER CENT TO ARVID LARSON, ALL OF VANCOUVER, WASHINGTON

SIGNALING DEVICE FOR AUTOS

Application filed March 14, 1928. Serial No. 261,677.

This invention relates to improvements in direction signals for vehicles and is especially adapted for application to automobiles having either open or closed bodies.

An object of the present invention is the provision of a signal device which may be attached to an automobile and operated to indicate start, stop and right or left turn or other changes in the direction of travel, means being provided whereby the driver may conveniently actuate the signal and adjustably position the same to indicate a desired movement.

Another object of the invention is the provision of means for automatically illuminating the signal when the latter is in active position, so that the signal may be readily seen at night, and for automatically extinguishing the illuminating means to prevent undue drain on the battery of the automobile.

Another object of the invention is the provision of novel means for mounting the signal and for actuating the same, so that the signal may be readily mounted in position for use in a manner to insure its proper and reliable operation.

With the above and other objects in view, the invention further includes the following novel features and details of construction, to be hereinafter more fully described, illustrated in the accompanying drawings and pointed out in the appended claim.

In the drawings:—

Figure 1 is a fragmentary view showing a portion of the body and windshield of an automobile with the invention applied.

Figure 2 is a fragmentary longitudinal section through the automobile illustrating the signal actuating means.

Figure 3 is an enlarged longitudinal section taken through the signal device.

Figure 4 is an enlarged section taken on the line 4—4 of Figure 3.

Figure 5 is a fragmentary elevation showing the upper end of the signal housing.

Figure 6 is a similar view with a switch housing shown in section.

Figure 7 is an enlarged fragmentary sectional view taken substantially on the line 7—7 of Figure 5.

Figure 8 is an enlarged section taken substantially on the line 8—8 of Figure 2.

Figure 9 is a fragmentary section on the line 9—9 of Figure 1.

Figure 10 is a similar view taken substantially on the line 10—10 of Figure 1.

Figure 11 is a detail elevation with parts in section and illustrating the flexible connection between the signal arm and the arm actuating means.

Referring to the drawings in detail wherein like characters of reference denote corresponding parts, the invention as shown comprises a housing indicated at 15. This housing is adapted to be secured to the windshield frame 16 of an automobile through the medium of clamps 17, as shown in Figures 1 and 10 of the drawings. However, the signal may be used upon closed body types of automobiles and for this purpose, a different type of attaching means may be employed.

The housing shown is of elongated character and is shaped substantially in conformity with the shape of an arrow and is disposed vertically at one side of the automobile. The outer edge of the housing 15 is open and pivotally mounted within this housing upon a pivot 18 at the upper end of the housing is a signal arm 19. This arm is also preferably arrow-shaped and is provided with oppositely arranged translucent walls 20 preferably colored red, the purpose of which will be presently apparent.

Carried by the signal arm 19 and extending through an arcuate slot 21 provided in the housing 15 is a stud 22. The slot 21 is arranged concentric with respect to the pivot 18 so that when the stud 22 is moved within the slot 21 the arm 19 will be sprung upon its pivot. For this purpose the stud 22 has secured thereto one extremity of a flexible member 23. This member 23 may consist of a Bowden wire which is actuated in a right angularly arranged tube 24. One end of this tube extends longitudinally of the housing 15 and is secured to said housing as shown at 25. The other end of the tube 24 extends into the vehicle, the tube extending through an exteriorly threaded sleeve 26. This sleeve is mounted within the side of the vehicle body and is held in place by lock nuts 27. The inner end of the flexible member 27 is pivotally secured to one end of an arm 28, the inner end of which is rigid with the rock shaft 29. The flexible member is preferably of sectional formation, the adjacent ends of the section having a threaded engagement with the tubular member 30. This member 30 forms a coupling between the sections of the flexible member 23 and permits of accurate adjustment of the length of said member to insure proper operation of the signal arm. The rock shaft 29 extends longitudinally of the steering column 31 of the automobile and is mounted upon said column through the medium of collars 32 and 33. The collar 33 carries a segment 34 whose opposite ends are connected to right angularly disposed arms 35. The upper end of the rock shaft 29 is mounted in a bearing 36 disposed within the angle of the arms 35. The upper end of the rock shaft 29 is provided with a right angularly arranged operating handle 37 and this handle is adapted to be received within spaced grooves 38 provided in the segment 34, the particular groove in which the handle 37 is positioned determining the position of the signal arm. For example, when the operating handle 37 is arranged as shown in Figure 8 of the drawings, the signal arm 19 will be positioned within the housing 15 and the signal will thus be in an inactive position. When the operating handle 37 is moved to the next succeeding notch the signal arm will be in the dotted line position S indicated in Figure 1 of the drawings to indicate the start or stop. When the operating handle is moved to the next notch 38, the signal arm will be in the dotted line position indicated at R in Figure 1 and will indicate a right turn, and when the operating handle 37 is moved to the furthermost notch, the signal arm will be in the dotted line position indicated at L in Figure 1 and will indicate a left turn. The operating handle 37 is yieldingly held within the notches by means of a spring 39.

In order that the signal device may be readily seen at night, the arm 19 has mounted therein electric bulbs 40. These bulbs are connected by means of conductors 41 with a contact 42 which is carried by the inner end of the signal arm and which extends through an opening 43 provided in the housing, into a box 44 which is carried at one side of the housing. Arranged within this box 44 and located in the path of movement of the contact 42 is a resilient contact arm 45. This arm is insulated from the box 44 as shown at 46, when the contact 42 is insulated from the signal arm 19 as shown at 47. The spring contact arm 45 is electrically connected to a conductor 48 which may lead to a source of current such as the storage battery of an automobile.

The contacts 42 and 45 are so arranged that when the signal arm 19 is located within the housing 15, these contacts will be spaced apart to interrupt a circuit through the lamps 40. However, when the signal arm is moved pivotally outward the contact 42 will engage the contact 45 and close a circuit through the lamps 40 so that the signal arm 19 will be illuminated and will readily attract attention. The circuit will remain completed until the signal arm is again positioned within the housing, whereupon the circuit will be broken so as to prevent drain upon the battery.

The invention is susceptible of various changes in its form, proportions and minor details of construction and the right is herein reserved to make such changes as properly fall within the scope of the appended claim.

Having described the invention, what is claimed is:

In a direction signal for vehicles a vertically disposed casing adapted to be secured to the side of a vehicle and open at its outer edge, a signal arm having one end pivotally secured and normally housed within the casing, said casing having a slot therein arranged concentric with respect to the pivot of the signal arm, a stud carried by said arm and projecting through the slot, a flexible member having one end arranged longitudinally of the casing with its extremity secured to the stud and its opposite end extending horizontally within the vehicle, means to guide the flexible member for longitudinal movement, means mounted upon the steering column of the vehicle to move said flexible member longitudinally to actuate said signal arm, and means controlled by the actuating means to adjustably position the signal arm.

In testimony whereof I affix my signature.

JACK REINI.